United States Patent [19]

Krieser et al.

[11] Patent Number: 4,733,361
[45] Date of Patent: Mar. 22, 1988

[54] LIFE USAGE INDICATOR

[76] Inventors: Uri R. Krieser, 24 Wrixon Avenue, East Brighton, 3187, Victoria; Ken F. Fraser, 4 Nambrook Close, Dingley, 3172, Victoria, both of Australia

[21] Appl. No.: 783,556

[22] Filed: Oct. 3, 1985

Related U.S. Application Data

[63] Continuation-in-part of Ser. No. 377,208, Apr. 29, 1982, abandoned.

[30] Foreign Application Priority Data

Sep. 3, 1981 [AU] Australia .................... PE5381

[51] Int. Cl.$^4$ ............................................ G01M 5/00
[52] U.S. Cl. .................................... 364/508; 364/506; 340/945; 73/577
[58] Field of Search .............. 364/506, 508, 550, 551, 364/554; 340/945; 73/577

[56] References Cited

U.S. PATENT DOCUMENTS

| | | | |
|---|---|---|---|
| 3,482,440 | 4/1968 | Curwen | 364/508 |
| 3,527,086 | 1/1969 | Evans et al. | 73/116 |
| 3,584,507 | 6/1971 | Hohenberg | 364/551 |
| 3,758,758 | 9/1973 | Games et al. | 364/508 |
| 3,781,869 | 12/1973 | Sudnick et al. | 364/508 |
| 3,955,070 | 5/1976 | Suzuki et al. | 364/508 |
| 3,979,579 | 9/1976 | Kleinpeter | 364/506 |
| 4,031,366 | 6/1977 | Hartung | 364/506 |
| 4,135,246 | 1/1979 | McMannis | 364/551 |
| 4,176,396 | 11/1979 | Howatt | 364/474 |
| 4,184,205 | 1/1980 | Morrow | 364/508 |
| 4,280,185 | 7/1981 | Martin | 364/506 |
| 4,336,595 | 6/1982 | Adams et al. | 364/508 |
| 4,352,293 | 10/1982 | Kurihara et al. | 364/508 |

FOREIGN PATENT DOCUMENTS

| | | | |
|---|---|---|---|
| 0475602 | 10/1975 | Australia | 364/508 |
| 1374107 | 11/1974 | United Kingdom . | |

OTHER PUBLICATIONS

K. F. Fraser, Department of Defence, Commonwealth of Australia, "The In-Flight Estimation and Indication of Cumulative Fatigue Damage to Helicopter Gears", Mar. 1984.

Primary Examiner—Errol A. Krass
Assistant Examiner—V. N. Trans
Attorney, Agent, or Firm—Stevens, Davis, Miller & Mosher

[57] ABSTRACT

Apparatus for determining the life usage of components subject to variable operating conditions particularly helicopter gears subject to variable torque. A monitor 10 provides an analogue signal of the level of operating parameter which is passed through conditioning means 26 including pre-amplifier 29, filter stage 31, multiplexer 38 and analogue to digital converter 40. A memory 42 stores life usage data for the component and a microprocessor 43 repeatedly samples the monitored level of the parameter and determines the life usage in successive time intervals. Electromechanical counter 53 provides a cumulative output of the life usage of the components. The microprocessor 43 also analyses the parameter levels into ranges or bands and the total time each component is operating in each range is stored and printed out.

11 Claims, 9 Drawing Figures

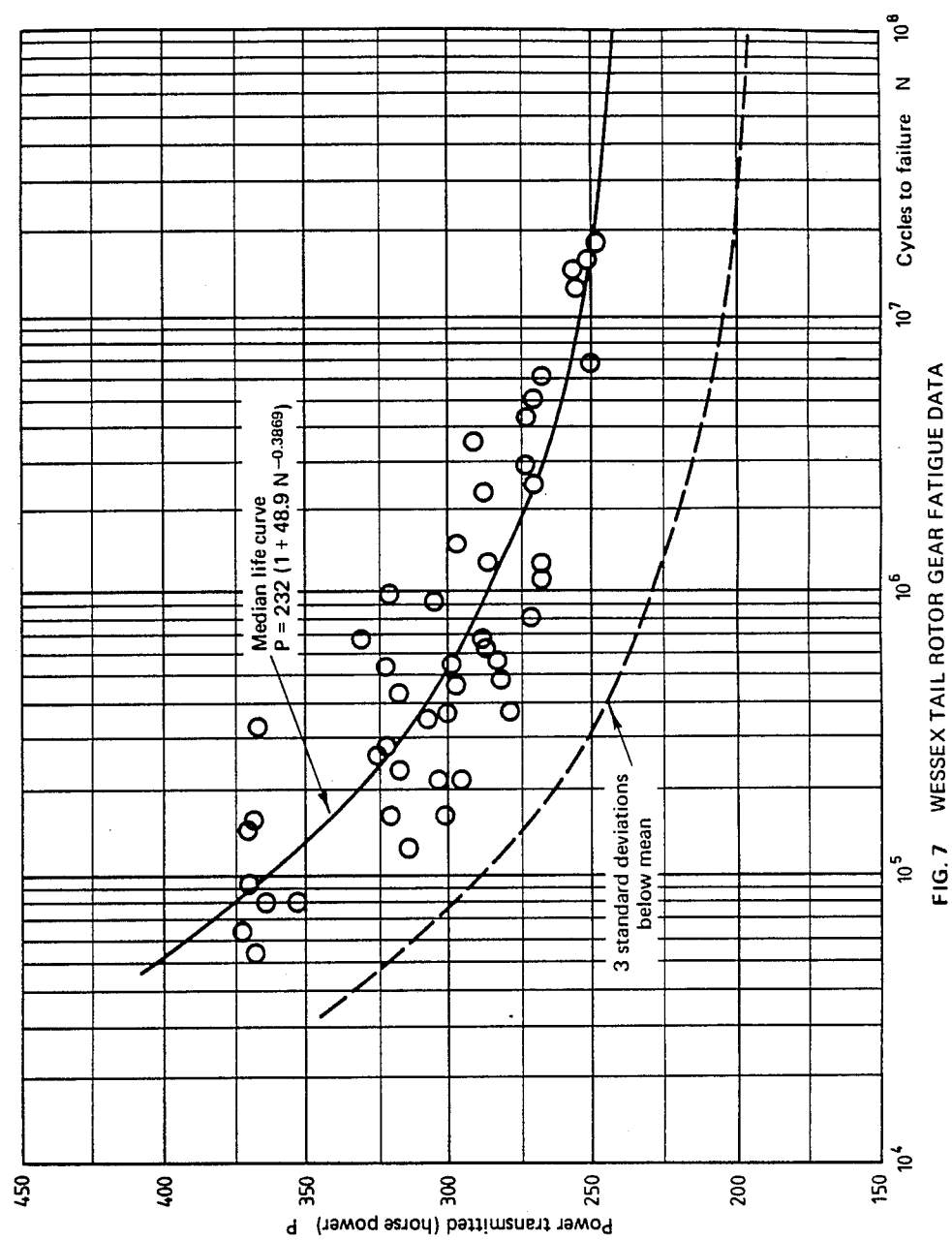
FIG. 7   WESSEX TAIL ROTOR GEAR FATIGUE DATA

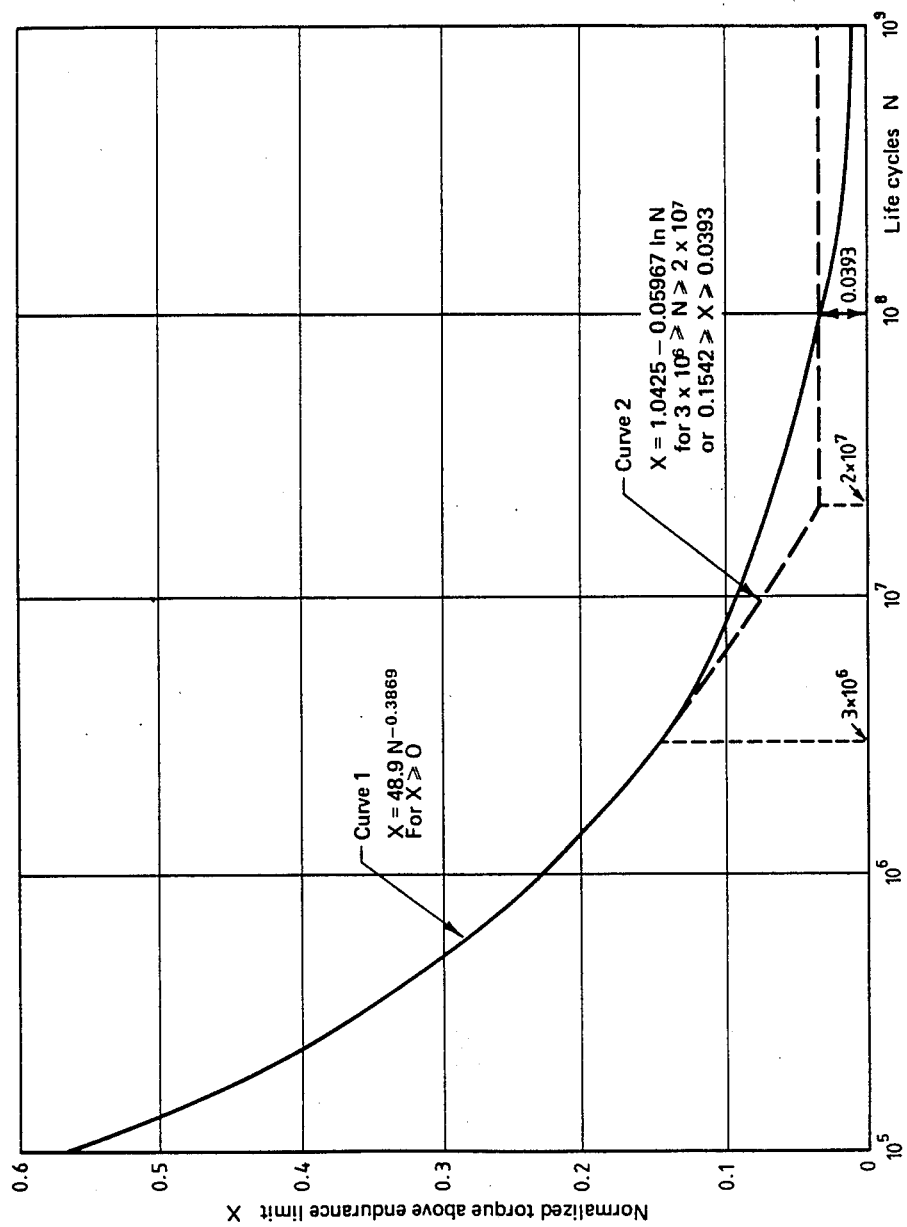

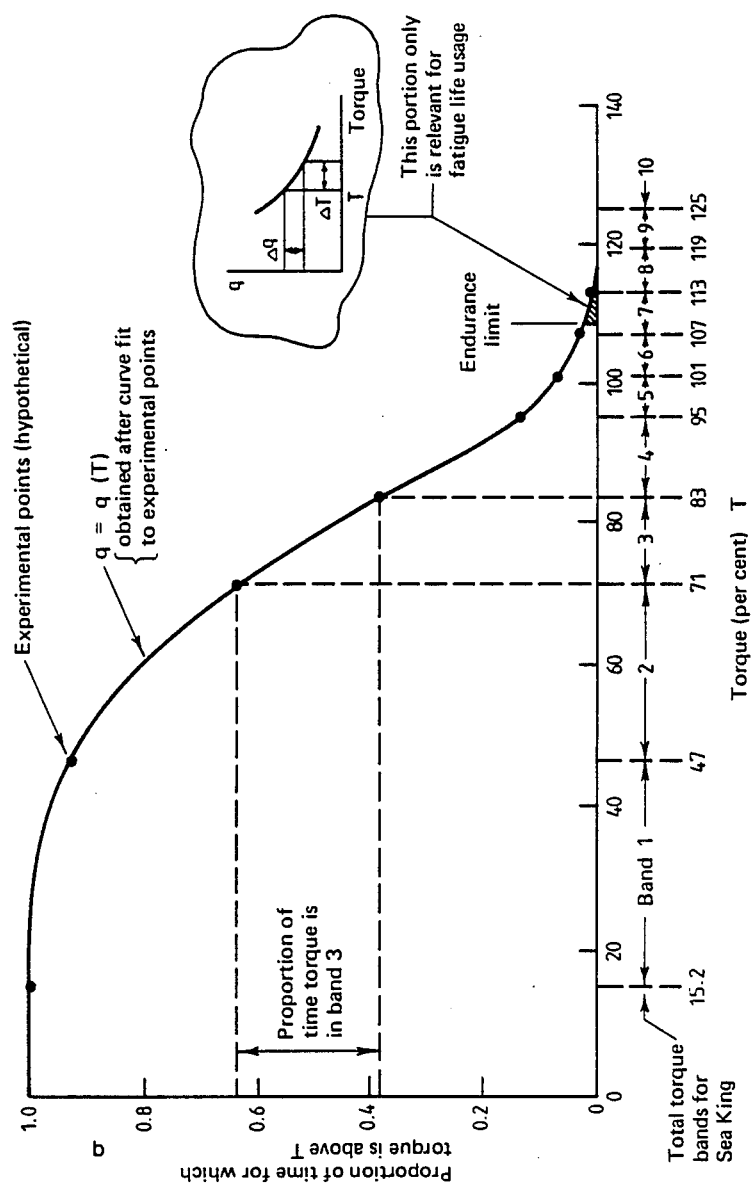
FIG. 9  TORQUE LOAD SPECTRUM

LIFE USAGE INDICATOR

This application is a continuation in part application of Ser. No. 377,208, filed Apr. 29, 1982, now abandoned.

FIELD OF THE INVENTION

This invention relates to apparatus for determining the deterioration of a component operable over a range of operating conditions that result in component deterioration at different rates. In particular the present invention relates to apparatus for monitoring operation of components to enable reliable predictions of the remaining useful life of the components to be made.

DESCRIPTION OF THE PRIOR ART

The life expectancy of a machine component operable under different conditions (e.g. stress, pressure, temperature) may vary according to those conditions. A manufacturer may supply data in the form of tables or graphs relating operating conditions to recommended repair or replacement intervals or such data may be obtained by bench testing components to destruction, but such data can be tedious to use particularly if the relationship between a variable operating condition and life expectancy is non-linear.

The present invention has been developed to monitor torque loading of gears in a helicopter gearbox, but is of more general usefulness. For example gas turbine discs are subject to stress failure and the present invention may be extended to allow for monitoring such components. However, it will be convenient to hereinafter describe the invention with particular reference to monitoring stress in transmission components of aircraft to enable estimations of safe fatigue life of such components to be made.

Components subject to high amplitude fluctuating loads may eventually undergo fatigue failure if a sufficiently high number of load cycles are applied before the component is replaced. In the simple arrangement of two gears in mesh each tooth will experience one load cycle per revolution of that gear. Under load a bending stress proportional to the torque transmitted will be developed at the gear root. For the gear the number of load cycles per unit time is given by the gear rotational speed. In the case of a gear tooth a fatigue failure is evidenced by a tooth crack or breakage. If gears are not subject to high loads there will be no tendency for fatigue failure to occur and life will then be limited by wear considerations.

Prediction of the safe life of such transmission components is of particular concern to aircraft operators as components must be replaced before failure occurs. Valid estimates of the safe life of helicopter transmission systems, apart from being vital for operational safety, are necessary for the formulation of an economic maintenance policy.

For fatigue life estimation of transmission components, two basic sets of data are required. Firstly gear fatigue data in the form of the number of cycles to failure as a function of stress level (S/N curve) is required together with a suitable stress or safety factor to define a "safe" curve. Secondly load spectra (giving proportion of operating time at various torque levels) must be available for the transmission under normal operating conditions. For helicopter transmissions computation of load cycles is simplified because gear rotational speed can be assumed to be constant.

Predictions of useful life of critical components in aircraft have in the past been carried out using a ground based digital computer. The predictions were made on the basis of operating data collected by measuring equipment on the aircraft and read manually at the end of each flight from the equipment. The measured data were processed in the computer with fatigue data from the component manufacturer to obtain an estimate of useful life of the components.

A disadvantage of prior art equipment is the need to manipulate relatively large amounts of data at frequent intervals. This procedure is not only time consuming and prone to error but necessitates use of equipment which is unnecessarily bulky due to the need to provide large displays for data. Prior art equipment additionally is not capable of providing continuous "on board" estimates of safe operating life of critical components.

SUMMARY OF THE INVENTION

It is an object of the present invention to provide apparatus for automatically and continuously determining the deterioration of a component operable over a range of operating conditions.

According to the present invention there is provided apparatus for determining the life usage of a component, the component being operable over a range of operating conditions defined in part by a particular operating parameter, the component being normally subject to deterioration at different rates over the range of operating conditions so that the rate of life usage of the component is dependent on the operating conditions subsisting at each instant in time, said component being arranged to have associated therewith an operating parameter monitor for providing a monitor signal representing a measure of said operating parameter of the component, said apparatus including: conditioning means for receiving said monitor signal and operative to condition said monitor signal for further processing, a life usage data memory having stored therein expected life usage data for said component for each of a plurality of mutually exclusive operating parameter ranges, and a life usage calculator connected to receive said conditioned monitor signal and connected to said life usage data memory, said life usage calculator being operative to carry out a range determination, said range determination comprising determining in which one of the operating parameter ranges the measure of said operating parameter represented by said conditioned monitor signal falls at that time instant and said life usage calculator being further operative to carry out a life usage calculation, said life usage calculation comprising calculating from the appropriate life usage data in said memory a first measure of expected component life usage, said calculator being further operative after a known time interval to repeat the operations of range determination and life usage calculation so as to provide a further measure of expected component life usage being a measure of expected component life usage within said time interval.

Preferably the life usage calculator is operative to calculate the measure of component life usage at known time intervals, so that after the time interval the steps of range determination and life usage calculation are repeated so as to provide further incremental measure of component life usage within that time interval. Also the time intervals are preferably constant and the conditioned monitor signal is updated at the constant time intervals, the memory having stored therein measures of life usage of the component at increments of level of the operating parameter for the time intervals, the calculator being operative to determine which of the increments of level corresponds to the conditioned monitor signal and to retrieve the respective measure of life usage from the memory.

The apparatus preferably further includes output display means connected to the life usage calculator and operative to provide a cumulative indication of component life usage.

The operating parameter monitor is preferably operable to generate an analogue signal representing the operating perameter level, and the conditioning means including an amplifier stage having a zero adjust means enabling the preselection of a non-zero monitor signal level below which the conditioned monitor signal represents a zero level of the operating parameter. The provision of zero adjust means enables preselection of a lower limit for the torque range of interest in the case of gear monitoring.

The apparatus of the present invention may be arranged to have an operating parameter monitor or monitors to determine the life usage of two or more components. The conditioning means may include a multiplexer for switching respective monitor signals to the life usage calculator, the multiplexer being switchable at a predetermined channel select rate.

BRIEF DESCRIPTION OF THE DRAWINGS

A preferred embodiment of the apparatus according to the present invention will now be described with reference to the accompanying drawings, in which:

FIG. 7 shows a gear fatigue failure curve, FIG. 8 shows a normalised gear endurance curve, and FIG. 9 shows a gear load spectrum.

DESCRIPTION OF THE PREFERRED EMBODIMENT

Figure 1:
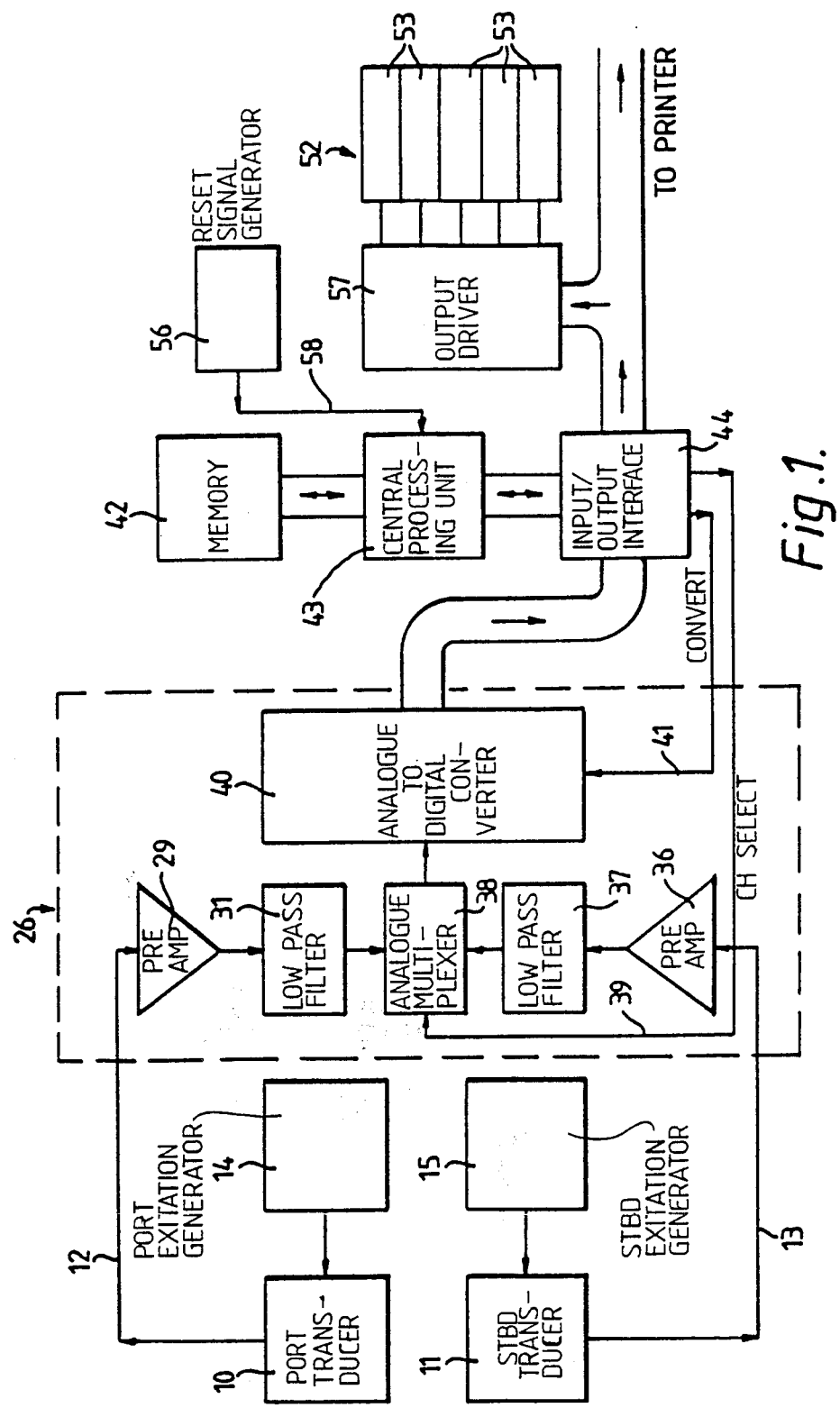
FIG. 1 shows a block diagram of the preferred form of life usage indicating apparatus according to the present invention.

Referring to FIG. 1 the apparatus is for determining the life usage of a helicopter gearbox component (not shown) operable over a range of torque loadings that result in component life usage at different rates. The component is arranged to have associated therewith an operating parameter monitor 10 for providing an analogue monitor signal on line 12 representing the level of torque loading of the component.

The monitor 10 may be of any suitable construction and be installed at any convenient location. Helicopter manufacturers frequently design special gearboxes which make torque indication convenient. The torque-measuring system employed in many helicopters is a hydraulic type which generates a pressure which is proportional to the torque loading. In some aircraft the pressure signal is transmitted directly to pressure gauges mounted in the cockpit. These gauges thus serve as torquemeters.

To monitor torque for the apparatus of the present invention it has been found convenient to insert a "T" connection in the hydraulic torquemeter pressure line and attach a pressure transducer 10. A strain gauge type of transducer 10 is used.

Figure 2:
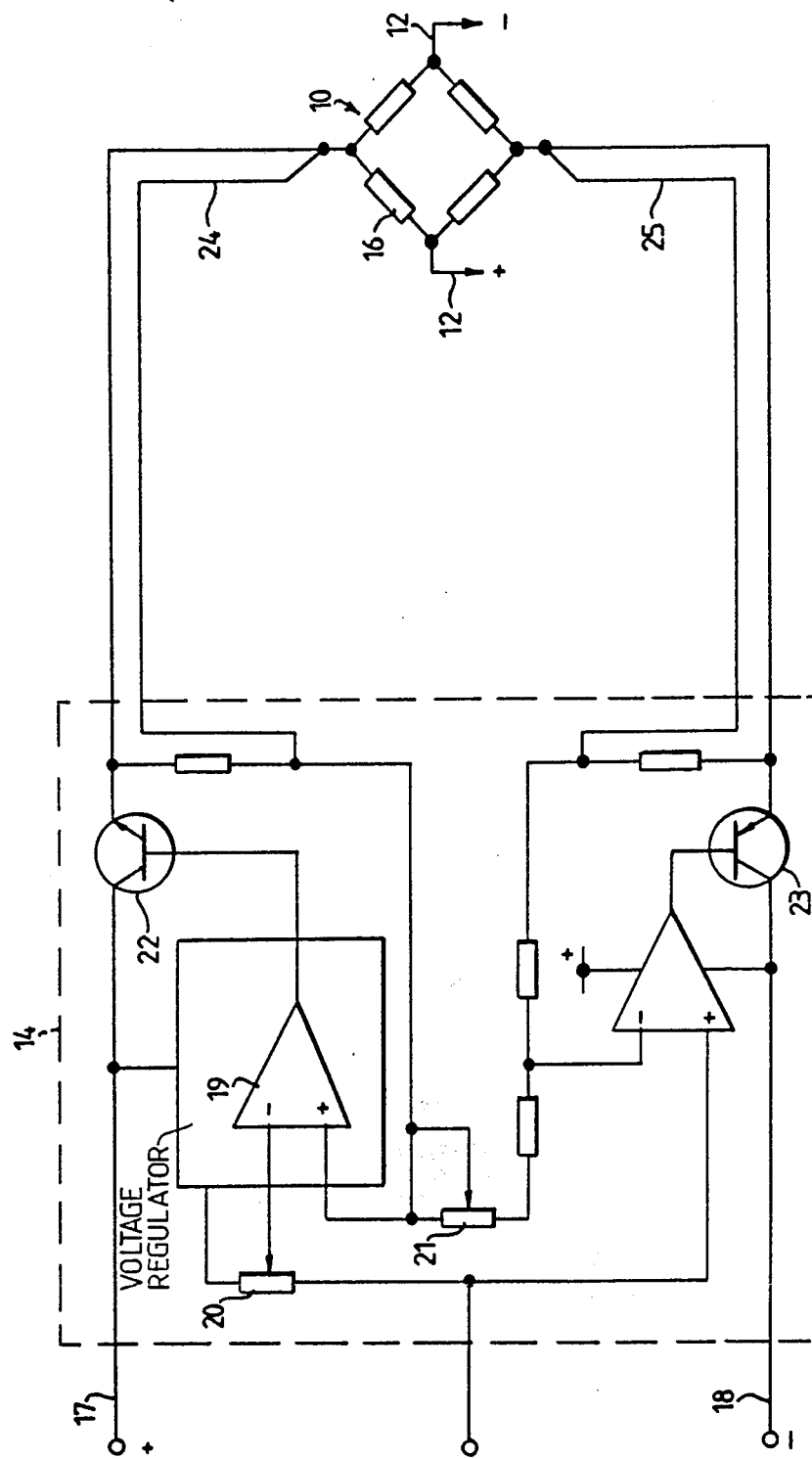
FIG. 2 shows the preferred form of operating parameter monitor suitable for use with the apparatus according to the present invention.

As shown in FIG. 2 the transducer 10 includes a resistive element 16, the resistance of which varies in proportion to the applied pressure. The transducer 10 comprises a Wheatstone bridge circuit, one arm of which includes the resistive element 16.

Because the strain gauge transducer 10 sensitivity is directly proportional to the bridge excitation voltage it is essential that a highly stable voltage supply 14 be used.

A voltage regulator 19 as shown in FIG. 2 is used in the generation of the required excitation. Input power is extracted through lines 17, 18 from the DC voltage supplies of the helicopter.

To reduce the common mode voltage to zero separate positive and negative supplies relative to signal common are generated. Such an arrangement has the advantage that any changes in common mode signal rejection with temperature in the following amplifier do not translate as zero shifts.

The highly stable LM723 is used as the voltage regulator 19. Excitation voltage level for both positive and negative outputs is set via potentiometer 20 and balance of the two supplies via potentiometer 21. Complimentary transistors 22,23 provide output drive power for the transducer 10.

To allow the transducer excitation voltage to be precisely set, independently of the length of transducer connecting cable used, sense leads 24,25 from each supply have been taken right to the transducer 10.

Returning to FIG. 1 the apparatus includes conditioning means 26 for receiving the monitor signal through line 12 and operative to condition the monitor signal for further processing. The conditioning means 26 includes an amplifier stage 26 (FIG. 3) having a zero adjust means 28 enabling the preselection of a non-zero monitor signal level below which the conditioned monitor signal represents a zero level of the torque loading of the gearbox component.

The amplifier stage 27 includes a pre-amplifier 29 of a differential input type and having low drift and excellent common mode rejection characteristics.

High frequency noise due to digital circuit switching and picked up on the incoming line 12 may produce a small DC offset in pre-amplifier 29 and therefore to eliminate this offset bypass capacitors 30 are incorporated in the input signal lines at the input of the pre-amplifier 29.

Figure 3:
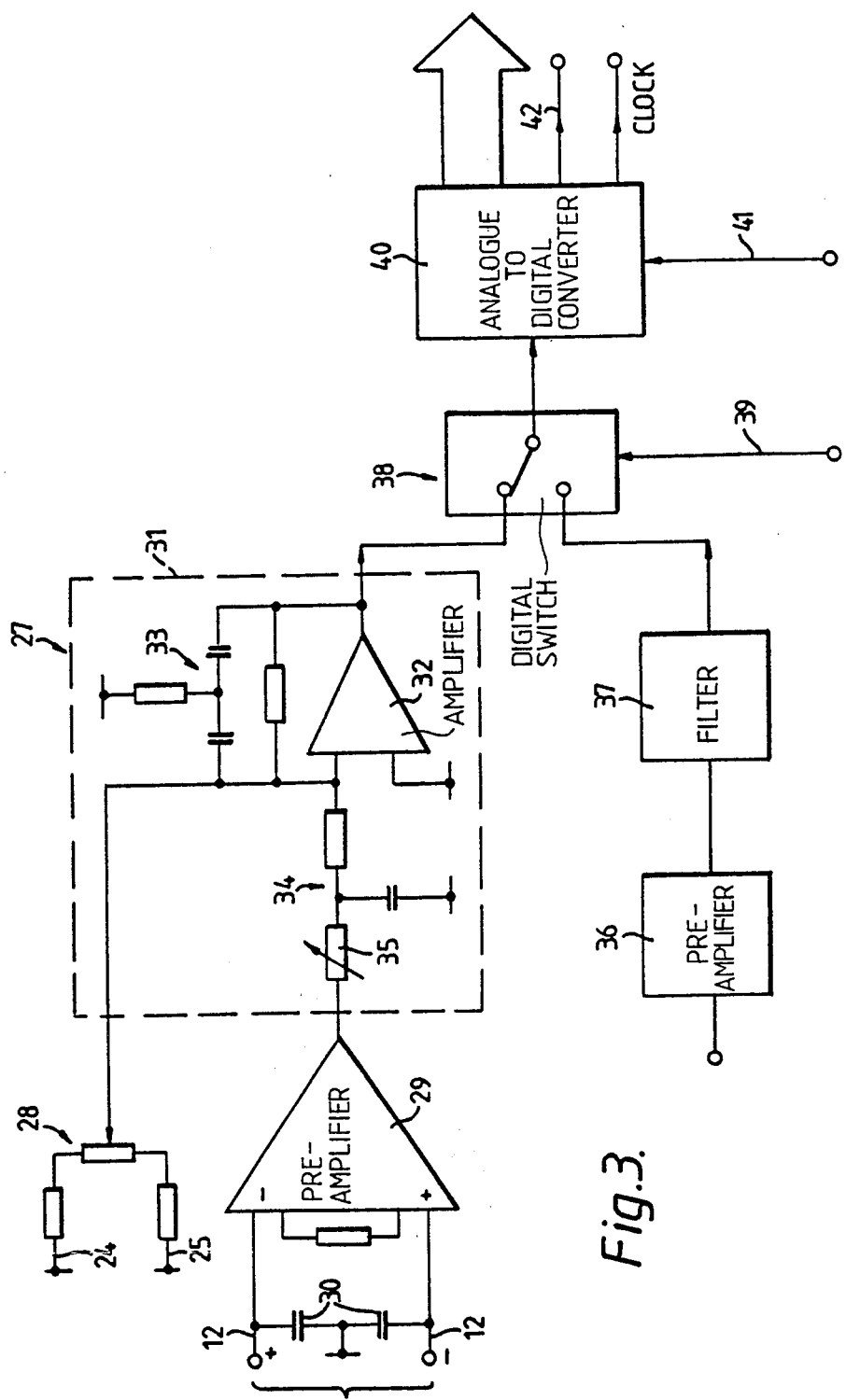
FIG. 3 shows the form of conditioning means.

The conditioning means 26 also includes a filter stage 31 for limiting of the signal bandwidth to just above helicopter blade passing frequency (e.g. 17 Hz). In FIG. 3, filter stage 31 comprising amplifier 32 and associated components forms a low pass filter having, say, 3 dB bandwidth of 25 Hz.

The filter stage 31 includes a bridged—T filter 33 in feedback circuit and an input filter 34 including a gain trim resistance 35 (which has little effect on filter response). Gain of the filter stage 31 may be set to about 2.

The zero adjust means 28 takes care of any zero offset from the transducer 10 and allows the system zero to be accurately set to correspond to any desired rated torque. Because of the need for very high zero stability the well regulated sense leads 24,25 from the transducer power generator 14 (FIG. 2) are used as supplies for the zero adjust means 28 as shown in FIG. 3.

The apparatus according to the present invention may be arranged to have operating parameter monitors 10, 11 for use in obtaining the deterioration of two or more components and each component would then be arranged to have a respective operating parameter monitor 10 associated therewith. As shown in FIGS. 1 and 3, port and starboard engines of a twin engined helicopter may both be monitored with transducers 10 and 11 associated therewith supplied from voltage supply 15. The monitor signal is passed along line 13 to preamplifier 36 and through filter stage 37.

In this arrangement the conditioning means 26 includes a multiplexer 38 for switching respective monitor signals to subsequent stages, the multiplexer 38 being switchable at a predetermined channel select rate supplied through line 39. The multiplexer 38 may be a CMOS analogue switch.

The conditioning means 26 also includes an analogue to digital converter (ADC) 40 for converting the analogue monitor signal from the filter stage 31 (or 37) to a digital signal upon receiving a convert command signal through line 41. The ADC 40 may be in integrated circuit such as a Datel type HX 12BMR having the following characteristics:

(i) Conversion is performed using the successive approximation technique.

(ii) A full scale unipolar unput range of 0 to 10 V is handled.

(iii) Output coding is complementary binary.

(iv) Resolution is 12-bit (1 part in 4096).

(v) A 12-bit parallel output and a serial output together with clock are available.

In the present application 100 conversions for both port and starboard channels may be performed per second.

Of the 12-bit output of the ADC 40 only the eight most significant bits may be needed by subsequent stages of the apparatus.

Alignment of the signal conditioning amplifiers 29,31 is carefully performed to provide an overall sensitivity of 0.6% rated torque per bit as provided at the output of the ADC 40. Since the four lowest bits are not read by the subsequent stages the effective sensitivity relative to the 12-bit ADC output is 0.6/16 (equal to 0.0375) percent rated torque per bit. The ADC 40 also generates a serial output 42, which may be used in conjunction with a circuit tester (not shown).

Referring again to FIG. 1 the apparatus also includes a life usage data memory 42 having stored therein life usage data for the component for a plurality of operating parameter levels, and a life usage calculator 43 connected to receive the conditioned monitor signal from the ADC 40 (through interface means 44) and connected to the life usage data memory 42, the life usage calculator 43 being operative to calculate a measure of component life usage.

In the preferred embodiment the life usage calculator 43 is operative to calculate the measure of component life usage at known time intervals and each said measure of component life usage calculated constitutes an incremental life usage for each respective time interval. The time intervals are preferably constant and the conditioned monitor signal is updated at the time intervals (according to the frequency of the convert command signals on line 41), the memory 42 having stored therein measures of life usage of the component at increments of level of the operating parameter for time intervals, and the calculator 43 being operative to determine which of the increments of level corresponds to the conditioned monitor signal and to retrieve the respective measure of life usage from the memory 42.

Figure 4:
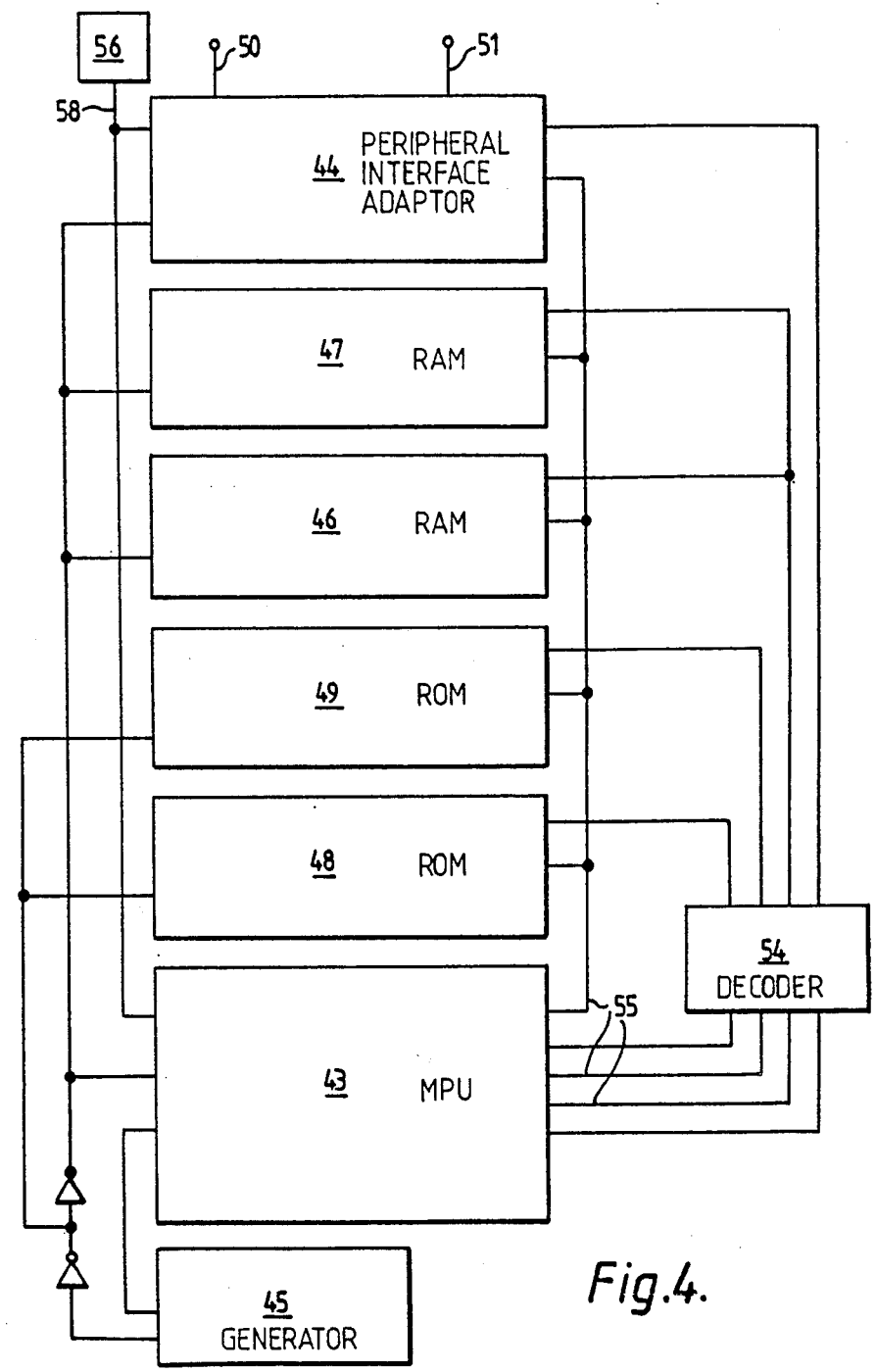
FIG. 4 shows the form of deterioration data memory and deterioration calculator.

In the embodiment of FIG. 4 the memory 48,49 calculator 43 and interface means 44 are components of a microcomputer system chosen for in-flight computation of gear fatigue life usage and based on the Motorola MC6800 microprocessing unit 43 (MPU) and associated components. This 8-bit processor 43 is suited to the present application which conveniently requires eight-bit input and eight-bit output digital data.

Crystal controlled clock signals at 1 MHz frequency are provided by generator 45.

Results of fatigue life usage computations performed during flight and other data required for post flight printout (described later) are stored in the 256 word (where 1 word≡8 bits) static random access memory (RAM) formed by 46 and 47. Read-only-memory (ROM) devices 48 and 49, which are of the ultra-violet light eraseable type, allow for program storage of up to 4K (4096) words.

A single peripheral interface adaptor (PIA) 44 provides all input/output communication for the system.

The input 50 to PIA 44 comprises the eight lines carrying the significant bits of the output of ADC 40. Output 51 comprises eight output lines which may be used in two modes under program control. In a first mode, two of the lines may be used for the channel select signals on line 39 and the convert command signals on line 41. Four more may be used for four individual gear life usage measure signals while a further line may provide total flying time signals. The remaining line indicates the mode of the output. In the second mode the first seven lines may carry stored data to a printer, the operation of which will be described later.

The apparatus of FIG. 1 includes output display means 52 connected to the life usage calculator 43 and operative to provide a cumulative indication of component life usage. The output display means 52 may comprise five electromechanical counters 53, four for individual gears of the transmission and the fifth for recording total flying time. As mentioned above five of the output lines 51 control the electromechanical counters 53 which can be actuated asynchronously under program control. The duration of the readout pulse is program controlled. Counters 53 for four gears are advanced by 1 for each micro-life unit expended and the total flying time counter is advanced by 1 for each second of flying time elapsed.

The apparatus may also include a printer (not shown) and when the flight is ended the mode of the output on line 51 may be automatically changed to initiate a printout. Alternatively a printout can be requested at any time by depressing a manual pushbutton (not shown).

These aspects of hardware operation relating to data input and output are controlled by the software which is described in more detail blow.

In FIG. 4, decoder 54 provides simple selection of ROM 48, ROM 49, RAM 46,47 or PIA 44 according to the logic levels applied to the address bus 55 from the MPU 43.

A reset signal generator 56 is provided to generate a reset signal automatically at helicopter "power-up", the reset signal being applied to the MPU 43 and PIA 44 for appropriate program initialization.

Figure 5:
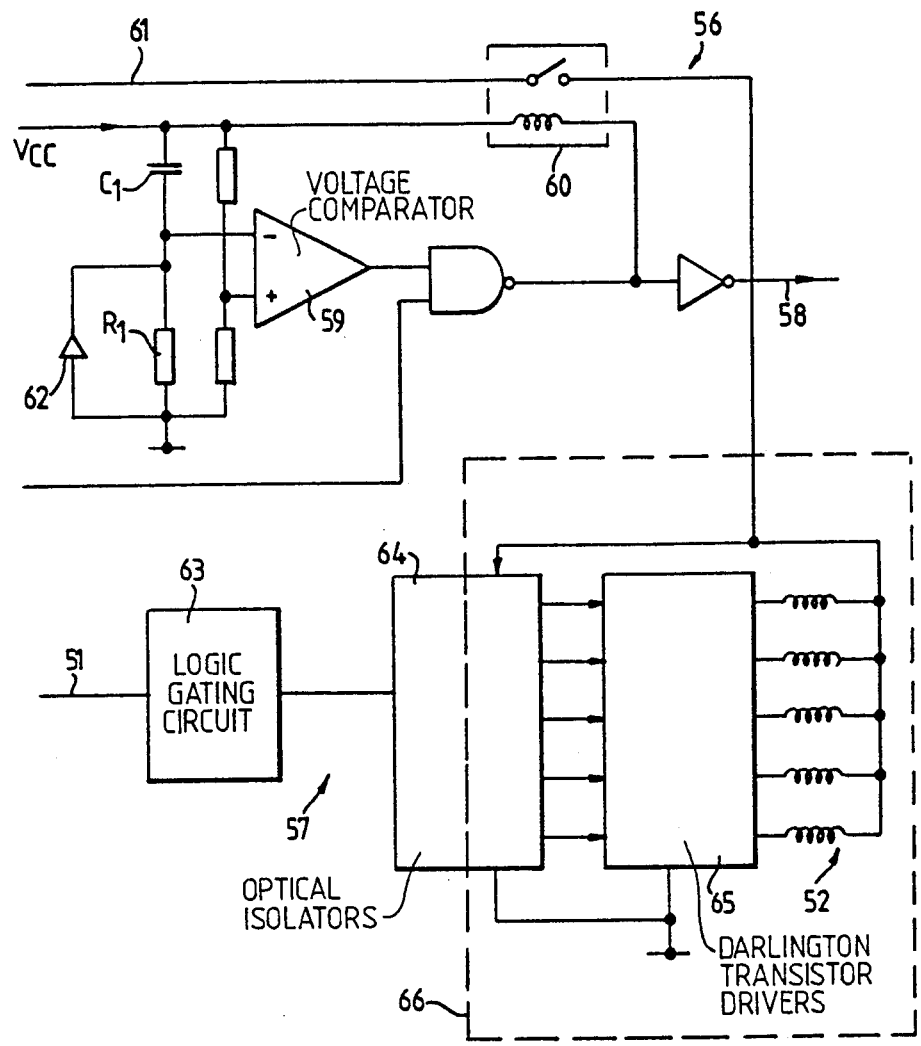
FIG. 5 shows the form of output interface means, output means and reset signal generator according to the present invention.

The reset signal generator 56 and driver 57 for the output display means 52 are shown in FIG. 5. This circuit performs two major functions:

(i) Automatic generation of a reset signal at power-up to initialize the microcomputer program sequence at the correct starting address, and (ii) Provision of circuits to interface with external equipment and with electromechanical counters 53.

When power is first applied during the start-up sequence the voltage Vcc (+5 V) will take a small time to stabilize. During the stabilization period the behavior of the microcomputer is unpredictable. It is essential that the reset signal on line 58 be held low until stabilization is achieved. Transfer to the program starting address will occur at the instant the reset signal changes to the high state.

Voltage comparator 59 and associated components generate an appropriate reset signal when system power is first applied. At the instant of switch-on capacitor Cl will be discharged and hence the voltage level on the "-" input to the comparator 59 will be initially higher than that on the "-" input. After a delay period equal to $0.7\times(Cl)\times(Rl)$ the comparator 59 will switch to its normal state and reset signal on line 58 will remain high thereafter. At the same time relay 60 will be energized and will transfer voltage from aircraft supply 61 to the electromechanical counters 53 and associated circuits. Diode 62 allows capacitor Cl to rapidly discharge through the circuits loading the Vcc (+5 V) regulator when main power is switched off.

The driver 57 includes a gating circuit 63 which is enabled during in-flight operation so as to gate signals on lines 51 (from PIA 44 in FIG. 4) via optical isolators 64 and Darlington transistor drivers 65 to the five electromechanical counters of display means 52. If the output mode line of output 51 changes state indicating that printing is in progress, the logic gating circuit 63 is operative to inhibit transfer of signals to display means 52. The optical isolators 64 prevent ground loop current flowing through the system, the ground loop isolation being shown by broken line 66 in FIG. 5.

Returning now to FIG. 4 and the operation of the calculator 43 and memory 42, as mentioned above the preferred arrangement comprises ROMs 48,49 having a program and life usage data stored therein. Functions of the program are:

(i) Real time computation and indication of fatigue life usage for the requisite (e.g. four) gears, (ii) Real time indication of total flying time, (iii) Real time storage of basic torque data for post-flight printout, (iv) Post-flight printout of basic torqueband data together with gear fatigue life usage and flying time data for the current flight.

High torque measurement accuracy is essential but high measurement resolution is not. By utilizing the eight more significant bits of the 12-bit output of ADC 40 a resolution of 0.6% rated torque per bit results. Such resolution for torque measurement is quite adequate for life usage estimation purposes provided allowance is made for the mean under-estimate applicable to such measurements. To accommodate worse case conditions it must be possible to handle twin-engine total torque values and single-engine torque values up to highest values possible in service. For the case of four gears of interest the factored endurance limits may vary considerably for one gear subject to total torque, to other gears subject to individual engine torque. In the first embodiment of the life usage indicator which was set for; 0.6% torque input resolution, the number of input values which had to be handled for fatigue life usage computation purposes was be of the order of 50 for each of the test gears.

The demands on sampling rate are not very stringent although the system must respond up to blade passing frequency (17 Hz). For each "sample" both torque inputs must be read and the usage for each of the four gears computed. It has been demonstrated that a sampling rate of 100 Hz can be readily achieved so that value of sampling rate may be adopted.

Analytical computations for the fatigue life usage per sample for values of torque within the range of interest discussed above can be pre-computed and entered as values in "look-up tables" in ROMs 48,49. Because all microcomputing systems are capable of very fast acquisition of values stored in tables such a method has been implemented in the present apparatus. This pre-computation and storage of measures of fatigue life usage is further explained in Appendix A. That is, the deterioration data memory 42 constituted by part of the capacity of ROMs 48,49 has stored therein measures of fatigue life usage for each of a plurality of torque level increments and for 0.01 second duration, and the MPU 43 retrieves the appropriate life usage measure for each received conditioned monitor signal level.

The look-up tables contain information obtained by:

(a) stress analysis of the gear tooth profile, (b) material fatigue failure analysis obtained by a series of failure tests on representative material, and (c) probability analysis to determine a "safe life" curve of life expenditure versus torque.

The deterioration calculator (MPU 43) may be programmed to allocate internal or RAM space as a life usage register for each component monitored and for storing a value of component fatigue life usage. The calculated or retrieved measure of component life usage for each time interval is added to the value in the register to provide an updated value of component life usage. The calculator 43 is further operative to determine whether the updated value exceeds a predetermined unit of life usage and, if so, to generate an appropriate output signal on lines 51 which is supplied to the output display means 52 to advance the respective counter 53 by one unit. The calculator 43 also reduces the updated value in the life usage register by the unit of life usage. In this way total fatigue life usage of each component is continuously updated and displayed by counters 53. When the readings on counters 53 approach a predetermined level the components can be serviced or replaced.

The calculator 43 is also programmed to allocate RAM space as a parameter level range memory for storing cumulatively the total time each component has operated in each of a plurality of mutually exclusive operating parameter ranges. That is, in the case of helicopter gear torque monitoring, there is memory space allocated for storing the total time that each gear has been operating in a particular range or band of torque values. The number of ranges or bands may be under program control. The calculator 43 is operative to determine in which one of the ranges the level of the operating parameter represented by the conditioned monitor signal falls for the instant time interval and to add the respective time interval to the total time stored in the respective range portion of the parameter level range memory. Automatically at the end of each flight, or upon manual push button command, the contents of the parameter level range memory may be printed enabling analysis of operating patterns of the components and regular or sampled cross-checking of the output displayed by counters 53 with computations carried out on the ground from the data printed out.

Figure 6:
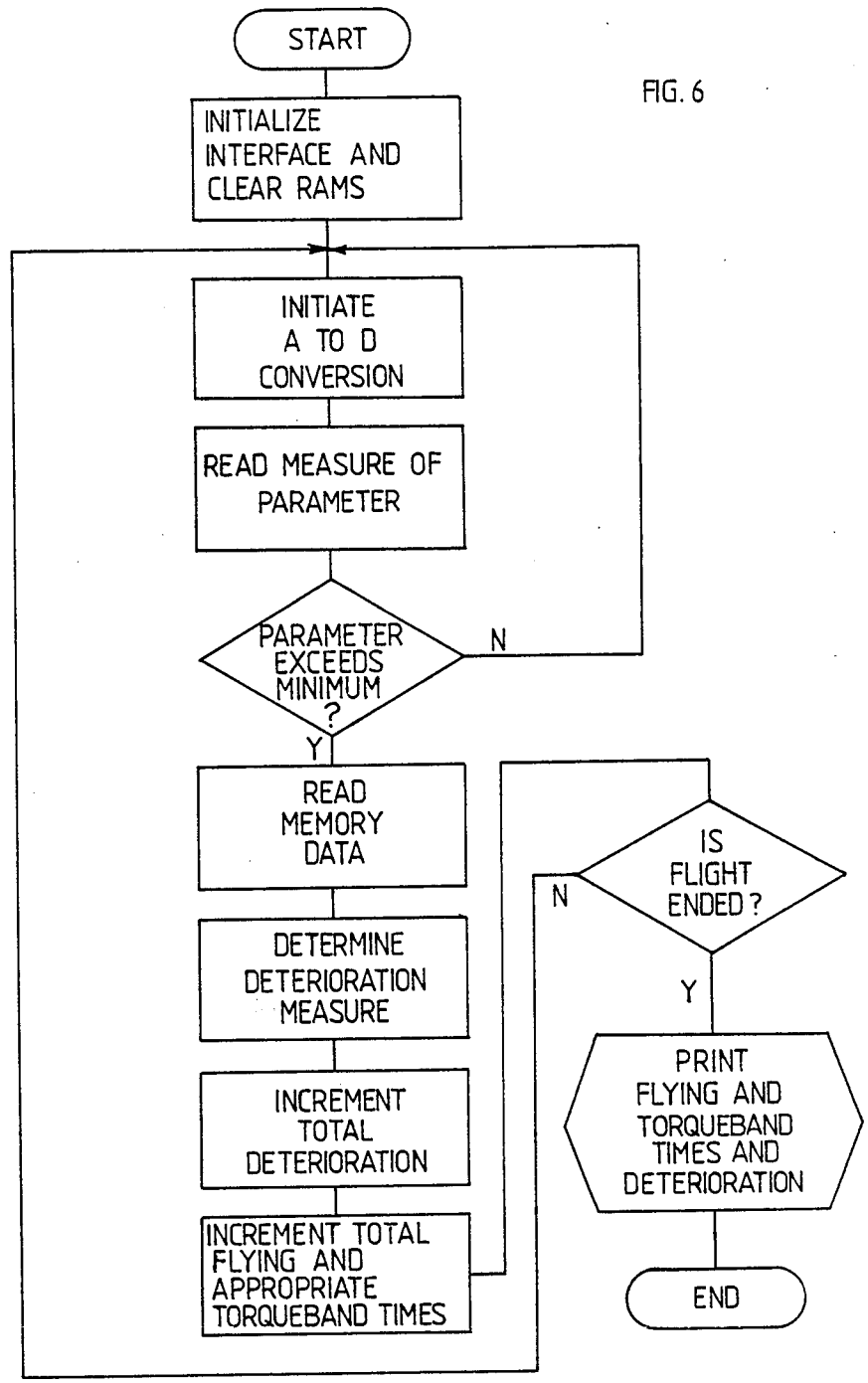
FIG. 6 is a flow chart of logic and processing operations of the preferred apparatus.

In FIG. 6 the flow chart shows the logic and processing operations of:

(a) initialization at helicopter "power-up", (b) causing signals from the transducers 10 to be converted to digital form, (c) reading the resulting digital signal, (d) comparing the parameter with a minimum value and, if the minimum is exceeded, proceeding with the following steps of:

(e) reading data from the memory for the appropriate parameter level, (f) determining, using that data, a measure of component deterioration, (g) incrementing a total deterioration display, (h) incrementing a respective registers for both the total flying time and the time in the appropriate torque band, and (i) if the flight is ended, printing out the times and the deterioration data.

It will be seen that the apparatus described herein can be used to automatically determine and provide a permanent continuously updated display of accumulated life usage of components subject to life usage at variable rates.

It will be appreciated that various modifications may be made to the apparatus described above with reference to the drawings. For example, where a component operates for relatively long periods of time under steady operating conditions, the time intervals between successive life usage calculation may be variable and under the control of sensing means operative to initiate a conversion in ACD 40 and a life usage calculation when a change in operating conditions is sensed. In this case, the memory 42 has stored therein measures of the rate of life usage of the component at increments of level of the operating parameter, the calculator 43 being operative to determine which of the increments of level corresponds to the conditioned monitor signal and to retrieve the respective measure of life usage rate from the memory and to calculate from the time elapsed since the previous calculation and from the retrieved measure of life usage rate a measure of component life usage. Thus the calculator 43 may be used during steady state conditions of the monitored component to perform other operations, but subject to interruption when a change in conditions is sensed.

APPENDIX A

ESTIMATION OF FATIGUE LIFE OF TRANSMISSION COMPONENTS

Three main variables influence the fatigue life of a component:

(i) Component geometry.
(ii) Properties of the component material or materials.
(iii) Level and nature of the service loads.

The effects of the first two may be described by a suitable curve as described below and the information for (iii) must be obtained from in-service load measurements.

A "safe" S-N curve for the transmission component of interest must be established before any estimates of safe fatigue life can be considered. Usually it is more convenient to consider torque (T) in lieu of stress (S) as the tooth root bending stress is proportional to applied torque and the T-N curve includes component geometry effects. Initially the standard T-N curve, defining mean cycles to failure at various torque levels, must be established by testing a sufficient number of gears to failure. By applying a suitable scatter factor to the standard relationship a "safe" T-N relationship can be formulated.

Tests were performed by the manufacturer on a sample of tail rotor gearbox bevel gears at various steady load levels in a closed circuit gear testing rig and these tests were used to establish a mean failure curve for the tail gears. A similar curve shape was assumed to apply for main rotor gear box (MRGB) components as these gears were of similar geometry, material and underwent similar heat treatment to the tail rotor gears.

Tests were performed at constant gear rotational speed and hence both torque and tooth root bending stress were proportional to power transmitted. Results of these tests were reproduced by the manufacturer in graphical form along the lines indicated in FIG. 7. The shape of the failure curve in this case was established by the manufacturer by drawing a best-fit curve through the medians of the logarithms of the endurances at each test torque level. The curve was given the mathematical form:

$$T = T_{EF}(1 + A_1 N^{-1/B_1})$$

Values of $A_1$ and $B_1$, and a nominal value for $T_{EF}$ were computed using three points on this best-fit curve. Estimated values for parameters $A_1$ and $B_1$, were used for calculating numerical values of parameters used in following analyses. Using experimental values of transmitted power (proportional to torque T assuming constant rotational speed) and N corresponding to each of the 47 failures, and the values of $A_1$ and $B_1$ estimated as above, the mean and standard deviation of the computed $T_{EF}$ values were established. A coefficient of variation (ratio of standard deviation to mean) of 0.068 resulted. The distribution of $T_{EF}$ was only moderately skewed and, within the restraints of the limited number of test points, approximated the normal distribution (a $X^2$ test applied to the test data shows that at 95% confidence level the data are consistent with the hypothesis that they conform to a Normal distribution). Values of $T_{EF}$ for critical MRGB gears were estimated from a smaller number of failure tests in a similar manner to that used for the tail rotor gears.

It has been suggested by many sources that a value three standard deviations below the mean provides a safe estimate of the extremes of scatter. A "safe" working relationship may be derived by applying such a factor to the computed mean endurance limit. Analytically the safe curve may be expressed as $$T = T_{ES}(1 + A_1 N^{-1/B_1})$$

The three-standard-derivation safe curve illustrated in FIG. 7 represents a stress or safety factor ($T_{EF}/T_{ES}$) of about 1.25. At this value of scatter factor the probability of premature gear failure occurring is approximately one in 1000 (as predicted by the Normal distribution).

The endurance relationship may be expressed in normalized form as $$X = \frac{T}{T_{ES}} - 1 = A_1 N^{-1/B_1}$$

where
 $A_1$ is a constant of value 48.9, and,
 $B_1$ is a constant of value 2.5846.
The endurance N may be expressed explicitly $$N = \left(\frac{A_1}{X}\right)^{B_1}$$

This normalized relationship, upon which the safe life estimations for MRGB components are based, is plotted in Curve 1 of FIG. 8. For convenience the N axis has been made logarithmic.

From tests to failure of five crownwheels in the MRGB, an unfactored endurance limit of 41677 lb. in. was established by the manufacturer. A scattor factor of 1.3 was then applied to establish the safe curve for the MRGB studies.

However, the manufacturer used a slightly modified curve as indicated in Curve 2 of FIG. 8 in its studies on the MRGB. This latter curve, which is based on Curve 1, exhibits an endurance limit at the value of load (or of X) which yields a life of $10^8$ cycles for Curve 1. For Curve 2 the endurance limit specified in this manner is considered to apply beyond $2 \times 10^7$ cycles (hence the portion of Curve 2 parallel with the X axis extending from $N = 2 \times 10^7$ cycles to $\infty$ and passing through Curve 1 at $N = 10^8$ cycles). A line drawn from the $2 \times 10^7$ cycles point to meet Curve 1 tangentially provides the next segment of Curve 2. The two curves meet at a value for N of about $3 \times 10^6$ cycles. For applied loads greater than that corresponding to a life of $3 \times 10^6$ cycles, Curve 2 is made to coincide with 1.

Analytically the relationship of Curve 2 can be expressed:

$$X = A_2 - B_2 \ln N$$

$$N = e^{(A_2 - X)/B_2}$$

in the range $2.9145 \times 10^6 \geq N \geq 2 \times 10^7$ or $0.1542 \geq X \geq 0.0393$, where $A_2$ is constant of value 1.04246 and $B_2$ is a constant of value 0.05967.

For $X < 0.0393$ N is considered to be infinite.

Some of the normalized torque values applicable for selected values of N are compared in the following table.

| | X | |
|---|---|---|
| N | Curve 1 | Curve 2 |
| $1 \times 10^8$ | 0.0393*1 | 0.0393 |
| $2 \times 10^7$ | 0.0732 | 0.0393*1 |
| $1 \times 10^7$ | 0.0957 | 0.0807 |
| $2.914 \times 10^6$ | 0.1542 | 0.1542 |
| $1 \times 10^6$ | 0.2333 | 0.2333 |
| $3 \times 10^5$ | 0.3717 | 0.3717 |
| $1 \times 10^5$ | 0.5686 | .05686 |

*2

For the range $0.039 < X < 0.154$ Curve 2 predicts more life usage than Curve 1 and thus Curve 2 is more conservative in that range. However Curve 1 does predict some fatigue life usage for $0 < X < 0.039$, whereas Curve 2 predicts no usage in that range. While conservative within the above range, Curve 2 represents a relationship that no physical system could obey by virtue of the abrupt change from infinite to finite life that the relationship implies for in infinitesimal change in torque loading.

From the data derived from life substantiation tests carried out on MRGB gears, the values of endurange limit applicable to all critical gears were computed. In cases where no failures occurred in tests involving at least three gears a "safe" endurance limit was obtained by applying a scatter factor of 1.24 to the test torque. In tests where failures occurred a scatter factor of 1.30 was applied if results for four or more gears were available.

From the gear fatigue data discussed in above it can be assumed that the relationship between torque load T and safe cycles at that torque is known. At this point it is worth defining a life usage term U which indicates the current proportion of total fatigue life used. Consider the torque range to be divided into a number of narrow bands of mean torque value $T_1, T_2 \ldots$ etc. If the gear is subject to $n_1$ cycles within the $T_1$ band, $n_2$ cycles within the $T_2$ band etc., then it is common practice to apply Miner's summation law[10] to quantify the cumulative damage.

$$U = \frac{n_1}{N_1} + \frac{n_2}{N_2} + \ldots \frac{n_k}{N_k}$$

$$= \sum_{i=1}^{K} \frac{n_i}{N_i}$$

Computation requirements for on-board computer provision of real-time indication of life usage will now be considered in general analytical terms. Assume that the incremental fatigue life usage u is to be computed each time the relevant transmission component torque T is measured.

$$u = \frac{s}{fN}$$

where
 s is gear rotational speed,
 f is number of torque readings taken per unit time (sampling frequency), and,
 N is the "safe" cycles at torque T.

For values of torque below the endurance limit N has infinite value and hence u is zero.

The current value of fatigue life usage U is given by $$U = \sum_{r=1}^{n} u_r$$

where
 r is a sample number suffix which has initial value 1 for a new gear with zero value of fatigue life usage, and,
 n is the current sample number.

When $U = 1$ (or other specified value) full life is considered to be expended. To take account of significant variations in indicated life usage which could occur due to measurement errors the value of U for which full life is considered to be expended can be suitable down rated. However the individual gearbox indicated-life replacement scheme should yield greater average lives for fatigue-critical gears than a fixed-interval scheme since, to be conservative, the latter must be based on extreme rather than typicl load excursions. The use of an individual gearbox indicated life replacement scheme could allow the fatigue lives of critical gears to be increased to such an extent that other factors such as wear effectively limit the component life.

To take into account the effects of finite resolution of the measuring system some refinements to the relationship expressed in the equation $$u = \frac{s}{fN}$$

are necessary. These refinements are to be further considered now.

The instrumentation developed according to the invention for torque spectrum or fatigue life usage indication digitizes the value of torque measured using a voltage analogue to digital converter (ADC). If the torque corresponding to a particular ADC reading i is $T_i$ then the system resolution can be defined as $T_{i+1} - T_i$ where i is an integer. If an ADC reading of i is obtained then all that can be deduced is that the true torque value T lies in the range $T_i \leq T < T_{i+1}$ assuming that the ADC is aligned in the normal manner such that a true torque input $T_i$ results in the ADC output being just on the switching point i-1→i. It follows that on the average the torque will be underestimated by an amount equal to $\frac{1}{2}(T_{i+1} - T_i)$ (i.e. half the resolution). Thus the magnitude of the mean underestimate is proportional to the system measurement resolution.

For torque spectrum indication the full torque range is divided into only 10 bands. Totalized times for all bands are thereby readily handled by front panel mounted electromechanical counters. In these instances the measurement resolution is much coarser than that provided by the ADC. Since there is no need to accurately measure instantaneous values of torque but there is a need to accurately measure the proportion of time above specified band limits, the low resolution measurement is quite satisfactory in this case. Basically it is essential that sufficient points be obtained on the q-T graph (FIG. 9) so that a curve can be accurately fitted to establish the relationship which applies at intermediate values of torque between the band limits. Once an adequate resolution to satisfy this condition has been established, no improvement in measurement precision can be provided by increasing the resolution. However any lack of precision in establishing the band changeover points will result in errrors being introduced. Hence for torque spectrum indication, high measurement precision is worth striving for but high resolution is not.

For fatigue life usage estimation during flight much higher resolution is necessary if the complex q-T curve fitting techniques which can be readily applied in a ground based analysis are to be avoided. However it is desirable that account be taken of the mean underestimate which is a fundamental characteristic of the conversion process. For a narrow torque band it can be assumed that, when considered over a long period, there will be equal probability that the true torque have any value within the band. Consider the band bounded by $T_i$ and $T_{i+1}$ which is applicable for an ADC reading of i. A better estimate for the fatigue life usage $u_i$ per sample is obtained by averaging as follows:

$$u_i = \frac{1}{T_{i+1} - T_i} \int_{T_i}^{T_{i+1}} U\, dT$$

$$= \frac{s}{f(T_{i+1} - T_i)} \int_{T_1}^{T_{i+1}} \frac{1}{N}\, dT$$

where $$u = \frac{s}{fN}$$

using the earlier equation,

Because of the non-linearity of the T-N relationship the above provides a better estimate of fatigue life useage than a computation based on mean torque $(T_i + T_{i+1})/2$.

For a linear torque measuring system the width of all torque bands will be equal and in such cased the above equation may be re-written.

$$u_i = \frac{s}{fG} \int_{T_i}^{T_i + G} \frac{1}{N}\, dT$$

where G is the torque band width.

To take account of an endurance limit $T_{ES}$ which has some intermediate value between $T_0$ and $T_1$ the fatigue life usage per sample for an ADC reading corresponding to $T_0$ is computed as follows.

$$u_0 = \frac{s}{f(T_1 - T_0)} \int_{T_{ES}}^{T_i} \frac{1}{N}\, dT$$

If the T-N Curve 2 is used 1.0393 $T_{ES}$ is substituted in the above equation in lieu of $T_{ES}$.

The general relationships developed in this section may be used for estimating life usage from torque readings taken using a torque measuring system with finite resolution.

Analytical computations according to the relationships developed above cannot, in general, be performed in real time at the 100 Hz rate if software computation techniques alone are used. Hardware elements now available for high speed computations could be used but considerably more complex hardware than that otherwise needed would then be required. On the other hand, analytical computations for the fatigue life usage per sample for values of torque within the range of interest discussed above can be pre-computed and entered as values in look-up tables. Because all microcomputing systems are capable of very fast acquisition of values stored in tables such a method has been adopted. Use of look-up tables and of integer arithmetic allowed the 100 Hz sampling rate to be realized.

One practical disadvantage of the use of tables is that there may be a need for the tedious repetition of the computation of table entries and their subsequent transfer to an assembly language program. Even a slight change in the value of any of the basic parameters (e.g. the endurance limit) can necessitate a repeat of the laborious computational process. To avoid the disadvantages of the above approach a computer program could be written for table entry computation using the formulae developed above. This program would accept basic data (factored endurance limit gear rotational speed etc) entered at the terminal and generate an output file which may be written directly in assembly language and provide all the relevant look-up values.

NOMENCLATURE $A_1$, $B_1$, $A_2$, $B_2$: gear fatigue curve shape constants
f: torque readings per second
G: width of torque band
N: gear endurance (used for cycles to failure and "safe" cycles)
$N_i$: safe cycles corresponding to torque band $T_i$
q: proportion of operating time torque T is exceeded
s: gear rotational speed
S: tooth root bending stress
T: torque corresponding to failure at N cycles
$T_1$: specified torque band
$T_{EF}$: highest torque for infinite life (corresponding to endurance limit)
$T_{ES}$: factored highest torque for infinite life
u: life usage per torque reading
$u_i$: life usage per torque reading for torque developed in band $T_i$
U: fraction of safe fatigue life expended
X: normalized amount by which torque endurance limit is exceeded

What is claimed is:

1. Apparatus for determining the life usage of a gear of a rotating gear system, said gear being operable over a range of operating conditions defined in part by a particular operating parameter, each tooth of said gear being normally subject to deterioration of a non-linear nature at different rates over the range of operating conditions so that the rate of life usage of the gear is dependent on the operating conditions subsisting at each instant in time, said gear being arranged to have associated therewith an operating parameter monitor for providing a monitor signal representing a measure of said operating parameter of said gear, said apparatus including: conditioning means for receiving said monitor signal and operative to condition said monitor signal for further processing, a life usage data memory have stored therein expected life usage data for said gear for each of a plurality of mutually exclusive operating parameter ranges, and a life usage calculator connected to receive said conditioned monitor signal and connected to said life usage data memory, said life usage calculator being operative to carry out a range determination, said range determination comprising determining in which one of the operating parameter ranges the measure of said operating parameter represented by said conditioned monitor signal falls at that time instant and said life usage calculator being further operative to carry out a life usage calculation, said life usage calculation comprising calculating from the appropriate life usage data in said memory a first measure of expected gear life usage, said calculator being further operative after a known time interval to repeat the operations of range determination and life usage calculation so as to provide a further measure of expected gear life usage being a measure of expected gear life usage within said time interval.

2. Apparatus according to claim 1, wherein said time intervals are constant and said conditioned monitor signal is updated at said time intervals, said memory having stored therein a measure of life usage of said gear for each of said operating parameter ranges for said time interval, said calculator being operative to carry out said range determination and to retrieve the respective measure of life usage from said memory.

3. Apparatus according to claim 1, wherein said time intervals are variable and said conditioned monitor signal is updated at said time intervals, said memory having stored therein a measure of the rate of life usage of said gear for each of said operating parameter ranges, said calculator being operative to carry out said range determination and to retrieve the respective measure of life usage rate from said memory and to calculate from said time interval and said retrieved measure of life usage rate said measure of gear life usage.

4. Apparatus according to claim 1 and further including output display means connected to said life usage calculator and operative to provide a cummulative indication of gear life usage.

5. Apparatus according to claim 4, wherein said life usage calculator includes a life usage register for storing a value of gear life usage, said calculated measure of gear life usage being added to the value in said register to provide an updated value of gear life usage, said calculator being further operative to determine whether said updated value exceeds a predetermined unit of life usage and, if so, to generate an output signal which is supplied to said output display means and to reduce the updated value in said life usage register by said unit of life usage.

6. Apparatus according to claim 1 and further including a parameter level range memory for storing comulatively the total time said gear has operated in each of said mutually exclusive operating parameter ranges, said calculator being operative to add the respective said time interval to the total time stored in the respective range portion of the parameter level range memory, said apparatus including printing means for printing the total times stored in the parameter level range memory.

7. Apparatus according to claim 1, wherein said operating parameter monitor is operable to generate an analogue signal constituting said monitor signal, said conditioning means including an amplifier stage having a zero adjust means enabling the preselection of a non-zero monitor signal level below which the conditioned monitor signal represents a zero measure of the operating parameter.

8. Apparatus according to claim 1 and operative to determine the life usage of two or more gears, each of said gears being arranged to have a respective operating parameter monitor associated therewith, said conditioning means including a multiplexer for switching respective monitor signals to said life usage calculator, said multiplexer being switchable at a predetermined channel select rate.

9. Apparatus according to claim 8, wherein said conditioning means includes an analogue to digital converter for converting said analogue signal to a digital signal upon receiving a convert command signal from said life usage calculator.

10. Apparatus for in-flight determination and display of the fatigue life usage of a plurality of helicopter transmission gears, the gears having gear teeth which are subject to differing stresses at different times as a result of differing torques being transmitted thereby, the rate of fatigue life usage of each gear at any instant being dependent on the level of torque being transmitted thereby, said apparatus including: a plurality of torque measuring monitors, one or more of the monitors being associated with each one of said gears, the said one or more of the monitors associated with each one of said gears providing a torque monitor signal representing the level of torque being transmitted by the associated gear; conditioning means for receiving said monitor signal for each gear and includig a multiplexer for sequentially switching between said monitor signals for said gears, said conditioning means being operative to condition the particular monitor signal being switched by the multiplexer at each time instant for further processing; a life usage memory having stored therein as look-up tables the expected life usage for each of the transmission gears for each of a plurality of mutually exclusive torque ranges; a life usage determining means connected to receive the conditioned monitor signal being switched by the multiplexer and being connected to said life usage memory, said life usage determining means being operative to carry out a range determination, said range determination comprising determining in which one of the torque ranges the level of torque represented by said conditioned monitor signal falls at that time instant and said life usage determining means being further operative to carry out a life usage determination, said life usage determination comprising reading from the appropriate life usage in said memory a first measure of expected life usage for the respective gear which is having its monitor signal being switched to the life usage determining means by the multiplexer at that time instant, said determining means being further operative after a known time interval to repeat for the same gear the operations of range determination and life usage determination so as to provide a further measure of expected gear life usage being a measure of expected life usage for the said same year within the same time interval; and display means connected to said life usage determining means and operative to provide a cumulative display of determined fatigue life usage for each of said transmission gears.

11. Apparatus according to claim 1, wherein said operating parameter monitor includes a differential pressure transducer and circuitry associated with said pressure transducer for ensuring that the voltage supply to said pressure transducer is substantially constant.

* * * * *